008F# 2,990,424
ESTER DERIVATIVES OF THIOGLYCOLIC ACID AND PROCESS OF PREPARING SAME

Henri Guinot, Versailles, and Philippe Le Henaff, Paris, France, assignors to UCLAF, Paris, France, a French body corporate
No Drawing. Filed Nov. 21, 1957, Ser. No. 697,794
Claims priority, application France Nov. 28, 1956
10 Claims. (Cl. 260—481)

This invention relates to new derivatives of thioglycolic acid and to their esters. More particularly, the invention concerns condensation products of thioglycolic acid with branched olefinic hydrocarbons.

In accordance with this invention there may be prepared condensation products of thioglycolic acid (mercapto-acetic acid) or of its esters having the following probable general formula:

$$R-CH-S-CH_2-COOR' \atop | \atop CH_3 \qquad (I)$$

wherein R is a branched hydrocarbon chain, and R' is a member selected from the group consisting of hydrogen and an alkyl radical.

The new compounds are prepared either by condensing thioglycolic acid or esters thereof with branched olefin hydrocarbons or mixtures of such hydrocarbons, or alternatively, by condensing the hydrocarbon with thioglycolic acid followed by subsequent esterification of the thioglycolic acid derivative thus formed.

As materials for condensation with thioglycolic acid or its esters, there may be used branched olefinic hydrocarbons or mixtures of such hydrocarbons. Advantageously, there may be employed, in accordance with this invention, branched olefin hydrocarbons containing from 8 to 12 carbon atoms, or their mixtures. Thus, for example, we may employ for condensation of hydrocarbon tripropylene, which is predominantly a $C_9$ olefin, but which may contain some $C_8$ and $C_{10}$ olefins. We may also utilize for the condensation the predominantly $C_{12}$ olefin known as tetrapropylene.

As condensation agents there are employed preferably, catalysts of the Friedel-Crafts type, such as, for example, aluminum chloride, zinc chloride, and boron fluoride.

The reaction where tetrapropylene is used as the olefin reactant, results in the formation of a derivative of thioglycolic acid having the following probable general formula:

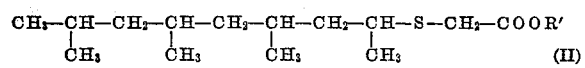

whereas, when tripropylene is used as the olefin, the reaction product has the probable general formula:

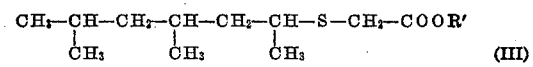

In the condensation the addition of the hydrocarbon molecule to the mercapto group of the thioglycolic acid takes place at the double bond.

The reaction may be carried out at ordinary temperature or with mild heating on the water bath. The thioglycolic acid or its ester, and the olefin hydrocarbon may be reacted as such in the presence of the aforementioned catalyst, or they may be reacted in the presence of an added solvent.

The esters of thioglycolic acid which may serve as starting materials, or to which the reaction products may subsequently be converted are alkyl esters, preferably lower alkyl esters.

The following examples serve to illustrate the invention but it is not, however, to be regarded as limited thereto.

EXAMPLE 1

Preparation of butyl S-(1,3,5,7-tetramethyl octyl)mercapto-acetate (II, R'=$C_4H_9$)

(a) IN THE PRESENCE OF ZINC CHLORIDE

A mixture of: G.
80% tetrapropylene _____ 105
Butyl thioglycolate _____ 74
Zinc chloride _____ 5 is heated in the water bath for two hours at 85–90° C. while being stirred mechanically. The formation of two layers will be noted, one dense and viscous on a zinc chloride base, the other lighter and less colored, containing the larger portion of the reagents present. The reaction mixture is allowed to cool and is washed twice with water in order to eliminate the zinc chloride; this discolors at the same time the reaction product.

The elimination of the non-reacted tetropropylene and butyl thioglycolate is either carried out by their entrainment with water vapor or by a distillation in vacuo, since the reaction product is of low volatility. This produces 91 g. of compound II (R=$C_4H_9$), or a yield of 58%. Taking into account the recovery of non-reacted tetrapropylene and butyl thioglycolate, the total yield amounts to 92%. The product is oily, and exhibits the following properties:

$d_4^{20}=0.937 \qquad n_D^{15}=1.472 \qquad B.P._{.2\ mm.}=189-195°\ C.$

Viscosity at 21° C. =10.9 centipoises.

This new compound has not been previously described in literature.

(b) IN THE PRESENCE OF ALUMINUM CHLORIDE

A mixture of: G.
80% tetrapropylene _____ 70
Butyl thioglycolate _____ 50
Aluminum chloride _____ 4 is treated as above, but without being heated.

Due to agitation the aluminum chloride dissolves liberating heat; it will be noted that only one layer is formed. After an hour the operation is interrupted, the solution is washed twice with water in order to eliminate the aluminum chloride, and the non-reacted tetrapropylene and butyl thioglycolate are distilled off in vacuo. The residue of the distillation which represents the compound II (R=$C_4H_9$) weighs 51 g. (or a yield of 48%). Taking into account the recovery of the non-reacted tetrapropylene and butyl thioglycolate, it will be found that the total yield exceeds 90%. The product is identical with that of the Example 1(a).

EXAMPLE 2

Preparation of S-(1,3,5,7-tetramethyl octyl) mercapto-acetic acid (II, R'=H) and conversion into butyl S-(1,3,5,7-tetramethyl octyl) mercaptoacetate The process described in Example 1(a) is followed, a mixture of: G.
80% tetrapropylene _____ 105
Thioglycolic acid _____ 46
Zinc chloride _____ 4 being heated at 90° C. for two and a half hours while being stirred.

As in the case of Example 1(a), the formation of two layers will be noted. Having been allowed to cool the mixture is washed twice with 25 cc. of 2 N hydrochloric acid in order to eliminate zinc chloride and excess thioglycolic acid, and is then washed with water. The product is very difficulty soluble in water, but does make it acid. After the non-reacted tetrapropylene has been distilled off in vacuo, there remain 79 g. of compound II (R'=H) which takes on an oily form, and shows a density of $d_4^{20}=0.991$.

In order to convert the product into butyl ester identical with the compound produced according to Example 1(a), all of the acid thus produced is placed in a flask on which a distilling column is mounted. 74 g. of butanol and 1 cc. of concentrated hydrochloric acid are added. This is heated on reflux, and the water that has formed during esterification is drawn off. When water no longer forms, i.e., after about six hours, the excess butanol is eliminated by distillation in vacuo; this produces a residue consisting of 97 g. of compound II (R'=C$_4$H$_9$) which is absolutely identical with the product obtained according to Examples 1(a) and (b).

This compound has not been described previously.

EXAMPLE 3

*Preparation of butyl S-(1,3,5-trimethyl hexyl) mercaptoacetate (III, R'=C$_4$H$_9$)*

A mixture of

| | |
|---|---|
| 70% tripropylene | g 97 |
| Butyl thioglycolate | g 74 |
| Zinc chloride | g 4 |
| n-Butanol | cc 4 | is treated according to the method of Example 1(a) at 90° C., for one and a half hours.

The product thus obtained weighs 91.5 g. (or a yield of 64%). Taking into account the recovery of tripropylene and butyl thioglycolate, the actual yield exceeds 92%.

The reaction product takes on an oily form, and has the properties:

$$d_4^{20}=0.962 \quad n_D^{15}=1.470$$

This product has not been previously described in literature.

The new industrial products to which the present invention relates are useful in the plastic materials industry, especially as plasticizers.

We claim:

1. An alkyl substituted thioglycolic acid compound of the formula

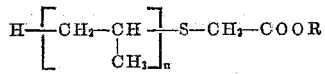

wherein:

R is a lower alkyl radical and
n is an integer from 3 to 4.

2. A tetrapropylene condensation product of thioglycolic acid having the general formula:

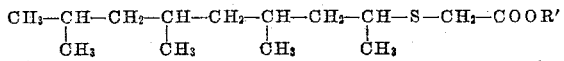

wherein R' indicates a lower alkyl radical.

3. A tripropylene condensation product of thioglycolic acid having the general formula:

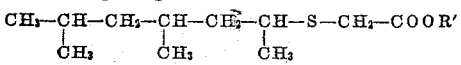

wherein R' indicates a lower alkyl radical.

4. n-Butyl (1,3,5,7-tetramethyl octyl mercapto)acetate.
5. n-Butyl (1,3,5-trimethyl hexyl mercapto)acetate.
6. In a process of producing an alkyl substituted thioglycolic acid compound of the formula

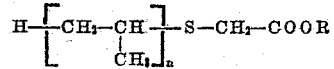

wherein:

R is a lower alkyl radical, and
n is an integer from 3 to 4, the step which consists in reacting a lower alkyl ester of thioglycolic acid with a propylene selected from the group consisting of tripropylene and tetrapropylene in the presence of an anhydrous Friedel-Crafts type catalyst selected from the group consisting of aluminum chloride, zinc chloride and boron fluoride.

7. The process according to claim 6, wherein the thioglycolic acid compound is the thioglycolic acid n-butyl ester.

8. The method of claim 6 in which the catalyst is anhydrous aluminum chloride.

9. The method of claim 6 in which the catalyst is anhydrous zinc chloride.

10. In a process of producing an alkyl substituted thioglycolic acid ester of the formula

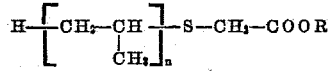

wherein:

R is a lower alkyl radical and
n is an integer from 3 to 4, the step which consists in reacting thioglycolic acid with a polypropylene selected from the group consisting of tripropylene and tetrapropylene in the presence of an anhydrous Friedel-Crafts type catalyst selected from the group consisting of aluminum chloride, zinc chloride and boron fluoride, and esterifying the resulting condensation product to form the lower alkyl ester.

References Cited in the file of this patent

UNITED STATES PATENTS

| 2,535,875 | Stewart | Dec. 26, 1950 |
| 2,603,653 | Kosmin et al. | July 15, 1952 |

FOREIGN PATENTS

| 532,676 | Great Britain | Jan. 29, 1941 |

OTHER REFERENCES

Smith et al.: Acta. Chemice Scand., vol. 8, No. 7, pp. 1111–19 (1954).